US011582017B2

United States Patent
Abotabl et al.

(10) Patent No.: US 11,582,017 B2
(45) Date of Patent: Feb. 14, 2023

(54) ENERGY PER RESOURCE ELEMENT DETERMINATION FOR SUB-BAND FULL-DUPLEX COMMUNICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Yeliz Tokgoz, San Diego, CA (US); Chih-Ping Li, San Diego, CA (US); Charline Hao, San Diego, CA (US); Abdelrahman Mohamed Ahmed Mohamed Ibrahim, San Diego, CA (US); Ronnie Machado, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/185,647

(22) Filed: Feb. 25, 2021

(65) Prior Publication Data
US 2021/0273774 A1 Sep. 2, 2021

Related U.S. Application Data

(60) Provisional application No. 62/983,440, filed on Feb. 28, 2020.

(51) Int. Cl.
*H04J 3/00* (2006.01)
*H04L 5/16* (2006.01)
(Continued)

(52) U.S. Cl.
CPC .............. *H04L 5/16* (2013.01); *H04L 5/1438* (2013.01); *H04W 72/0446* (2013.01)

(58) Field of Classification Search
CPC ......... H04L 5/16; H04L 5/1438; H04L 5/003; H04L 5/0048; H04W 52/267; H04W 52/325; H04W 72/0446
See application file for complete search history.

(56) References Cited

U.S. PATENT DOCUMENTS

2010/0254471 A1* 10/2010 Ko ................... H04L 5/0023
375/260
2013/0083710 A1* 4/2013 Chen ................ H04W 72/042
370/281

(Continued)

FOREIGN PATENT DOCUMENTS

| EP | 3349407 A1 | 7/2018 |
|---|---|---|
| GB | 2498559 A | 7/2013 |
| GB | 2499259 A | 8/2013 |

OTHER PUBLICATIONS

International Search Report and Written Opinion—PCT/US2021/070197—ISA/EPO—Jun. 8, 2021.

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment (UE) may determine an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and perform a communication in the slot in accordance with the EPRE value. Numerous other aspects are provided.

30 Claims, 10 Drawing Sheets

(51) Int. Cl.
*H04L 5/14* (2006.01)
*H04W 72/0446* (2023.01)

(56) References Cited

U.S. PATENT DOCUMENTS

2015/0071062 A1* 3/2015 Cheng .................. H04L 5/16
   370/230
2015/0092691 A1* 4/2015 Hwang ............... H04L 27/2647
   370/329
2016/0353317 A1* 12/2016 Kim .................. H04W 28/0236
2017/0078903 A1* 3/2017 Kusashima ........... H04L 5/0057
2018/0254926 A1* 9/2018 Kim .................. H04L 25/03821
2019/0357149 A1* 11/2019 Zhang ....................... H04L 5/16
2020/0170031 A1* 5/2020 Lee ...................... H04L 5/0007

* cited by examiner

ENERGY PER RESOURCE ELEMENT DETERMINATION FOR SUB-BAND FULL-DUPLEX COMMUNICATION

CROSS-REFERENCE TO RELATED APPLICATION

This Patent Applications claims priority to U.S. Provisional Patent Application No. 62/983,440, filed on Feb. 28, 2020, entitled "ENERGY PER RESOURCE ELEMENT DETERMINATION FOR SUB-BAND FULL-DUPLEX COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for energy per resource element (EPRE) determination for sub-band full-duplex (SBFD) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include determining an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and performing a communication in the slot in accordance with the EPRE value.

In some aspects, a method of wireless communication, performed by a base station, may include determining an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and communicating with a UE in the slot based at least in part on the EPRE value.

In some aspects, a UE for wireless communication may include memory; one or more processors coupled to the memory; and instructions stored in the memory and operable, when executed by the one or more processors, to cause the UE to determine an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and perform a communication in the slot in accordance with the EPRE value.

In some aspects, a base station for wireless communication may include memory; one or more processors coupled to the memory; and instructions stored in the memory and operable, when executed by the one or more processors, to cause the base station to determine an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and communicate with a UE in the slot based at least in part on the EPRE value.

In some aspects, a non-transitory computer-readable medium may store one or more instructions for wireless communication that, when executed by one or more processors of a UE, may cause the UE to determine an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and perform a communication in the slot in accordance with the EPRE value.

In some aspects, a non-transitory computer-readable medium may store one or more instructions for wireless communication that, when executed by one or more processors of a base station, may cause the one or more processors to determine an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and communicate with a UE in the slot based at least in part on the EPRE value.

In some aspects, an apparatus for wireless communication may include means for determining an EPRE value for a slot based at least in part on whether the slot is associated with a half-duplex configuration or a full-duplex configuration for a base station associated with the apparatus, wherein the EPRE value is a first value when the slot is associated with the half-duplex configuration and a second value when the slot is associated with the full-duplex configuration; and means for performing a communication in the slot in accordance with the EPRE value.

In some aspects, an apparatus for wireless communication may include means for determining an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and means for communicating with a user equipment (UE) based at least in part on the EPRE value.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
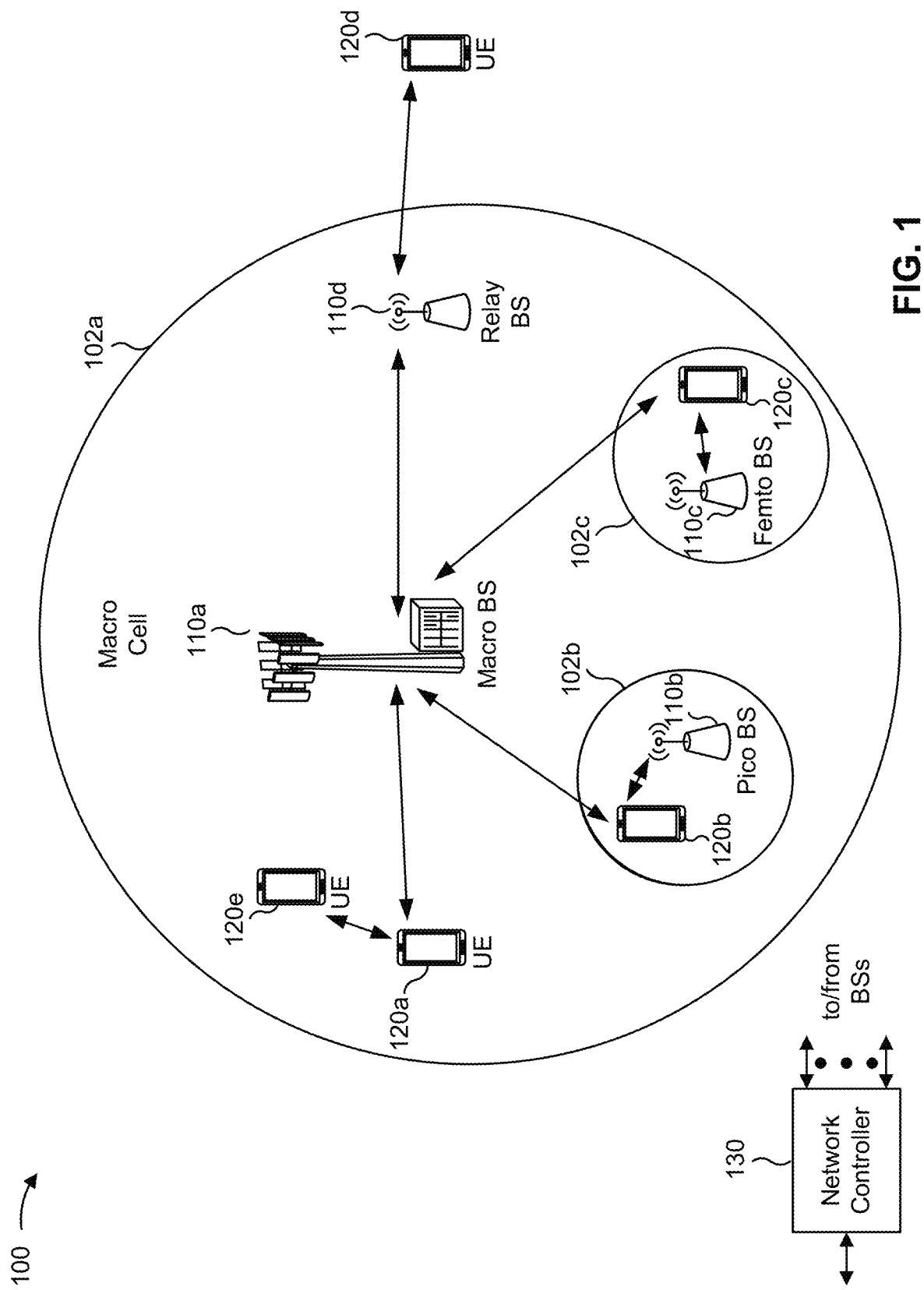
FIG. 1 is a diagram illustrating an example of a wireless network, in accordance with various aspects of the present disclosure.

A UE and a base station may communicate based at least in part on an energy per resource element (EPRE). An EPRE identifies an energy level at a resource element (RE) granularity for an uplink communication or a downlink communication. EPRE may be set and updated via radio resource control (RRC) signaling, for example, by modifying a set of parameters associated with the EPRE. However, in sub-band full-duplex (SBFD) deployments, a slot configuration (e.g., full-duplex versus half-duplex) may change from slot to slot. RRC configuration or reconfiguration may not provide sufficient responsiveness for slot-to-slot modification of the EPRE. If the same EPRE is used for full-duplex slots and half-duplex slots, the base station and the UE may experience increased self-interference, power-limited scenarios, and diminished throughput.

Some techniques and apparatuses described herein provide determination and/or signaling of EPRE on a slot-to-slot granularity, for example, for transitioning between half-duplex slots and full-duplex slots. For example, a base station may configure separate EPRE values for half-duplex slots and full-duplex slots, may configure an offset for a full-duplex slot EPRE relative to a half-duplex slot EPRE, and/or the like. Some UEs may determine whether to use a full-duplex slot EPRE or a half-duplex slot EPRE based at least in part on whether a slot is a full-duplex slot or a half-duplex slot, whereas other UEs may be configured or may receive a dynamic indication regarding whether to use the full-duplex slot EPRE (e.g., based at least in part on whether a UE is capable of determining whether a slot is a full-duplex slot or a half-duplex slot). Thus, slot-to-slot adjustment of EPRE based at least in part on full-duplex slots and half-duplex slots is provided. The slot-to-slot adjustment of EPRE may reduce self-interference at the base station and improve performance in the full-duplex mode, thereby increasing throughput, improving utilization of communication resources, and improving coverage, particularly at the cell edge.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
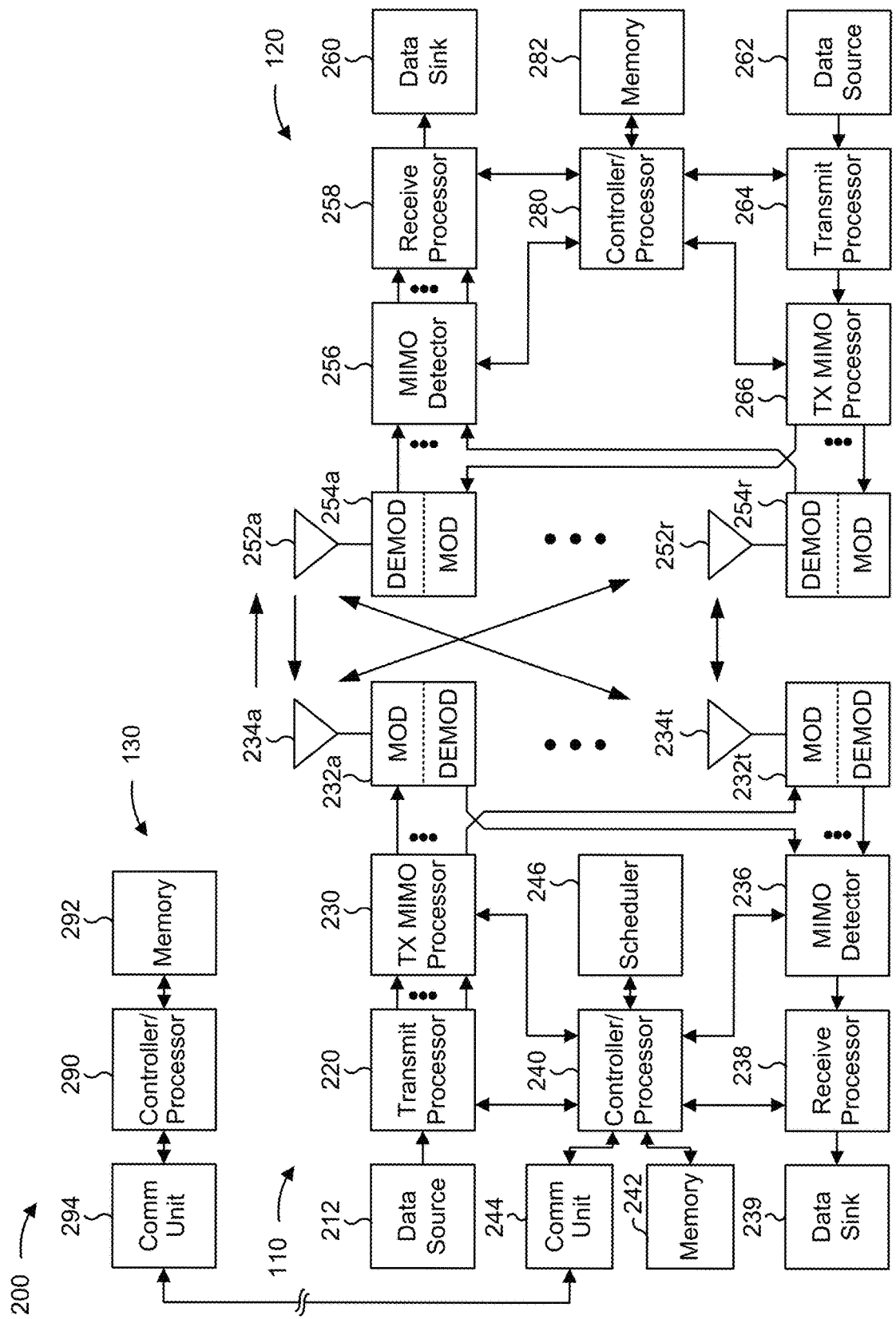
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110, controller/processor 280 of UE 120, and/or any other component(s) of FIG. 2 may perform one or more techniques associated with EPRE determination for SBFD communications, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
FIG. 3 is a diagram illustrating an example of a slot-based full-duplex (SBFD) configuration and a baseline time division duplexing (TDD) configuration, in accordance with various aspects of the present disclosure.

FIG. 3 is a diagram illustrating examples of an SBFD configuration and a baseline TDD configuration, in accordance with various aspects of the present disclosure. FIG. 3 shows examples of time intervals (e.g., slots, slot groups, subframes, sub-slots, mini-slots, and/or the like). A time interval may include an uplink frequency region, a downlink frequency region, or both an uplink frequency region and a downlink frequency region. Each time interval may be associated with a control region, which is illustrated as a darker-shaded portion of the time interval, and/or a data region, which is shown as DL Data for the downlink frequency region or physical uplink shared channel (PUSCH) for the uplink frequency region. Uplink frequency regions are illustrated using a tighter dotted fill than downlink frequency regions.

A frequency division duplexing (FDD) configuration may indicate one or more downlink frequency regions and one or more uplink frequency regions. For example, an FDD configuration may divide an unpaired band (e.g., one or more component carriers of an unpaired band) into uplink frequency regions, downlink frequency regions, and/or other regions (e.g., guard bands and/or the like). Examples of unpaired bands include NR operating bands n40, n41, and n50. In some aspects, the FDD configuration may identify bandwidth part (BWP) configurations corresponding to the uplink frequency regions and downlink frequency regions. For example, a respective BWP may be configured for each uplink frequency region and each downlink frequency region. A BWP is a configured bandwidth that a UE can use for communication. A BWP can be configured for a UE, then activated for communication using downlink control information.

An uplink frequency region and a downlink frequency region may or may not be equal in bandwidth. For example, in the example 300 shown in FIG. 3, the two downlink frequency regions, shown by reference numbers 310 and 320, occupy a smaller bandwidth than the uplink frequency region shown by reference number 330. In this case, the uplink frequency region is provided between the downlink frequency regions, which may reduce interference from downlinks of other BSs 110 associated with frequencies adjacent to the component carrier of example 300.

The usage of SBFD (also referred to as FDD in unpaired spectrum) may increase throughput and improve spectral efficiency, and may enable the usage of always-on uplink (e.g., for ultra reliable low latency communication (URLLC) control channels). For example, consider, as a baseline, a TDD configuration of down-down-special-up, shown by reference number 340. This may be associated with, for example, a downlink cell edge rate of 22.5 Mbps and an uplink cell edge rate of 37.5 kbps (e.g., with a 2.5 Mbps median user rate, that is 20 dB less the maximum coupling loss (MCL)). In this case, SBFD with an 80 MHz downlink and a 20 MHz uplink may reduce downlink cell edge spectral efficiency (SE) by 0.8, assuming power spectral density (PSD) is not increased to utilize baseline power. In such a case, 24~30 Mbps may be achievable with a full duty cycle. The uplink UE SE may have no change at the cell edge and at the median. In this case, 250 kbps may be achieved at the cell edge, and 10 Mbps may be achieved at the median. Performance may be further improved for a full-duplex UE. In this case, assuming the same parameters as the previous example, a downlink throughput of 30 Mbps and an uplink throughput of 250 kbps may be concurrently achieved. It should also be noted that the usage of FDD in the unpaired spectrum may improve utilization of uplink resources, since a given UE cannot typically utilize the full uplink bandwidth due to limitations on the UE's transmit power.

A base station may operate in a full-duplex TDD mode. For example, the base station may switch, on a slot-to-slot basis, between full-duplex TDD mode and half-duplex mode. The base station may schedule communications with various half-duplex or full-duplex UEs. The base station may experience some amount of interference in connection with the full-duplex TDD mode, for example, due to self-interference between transmit antennas and receive antenna of the base station, reflection from obstructions in the channel, or inter-cell interference. The base station may perform various techniques for nullifying or cancelling self-interference, such as antenna isolation (using physically separated antennas for transmission or reception), analog interference cancellation, digital interference cancellation, massive MIMO (M-MIMO) based beamforming nulling for clutter reflection, and SBFD to achieve isolation based at least in part on an adjacent channel leakage ratio (ACLR), and/or the like. In SBFD, the downlink and the uplink are in different portions of a band or component carrier (CC). A guard band (GB) may be provided between the uplink and the downlink. Receive weighted overlap and add (WOLA) operations may reduce ACLR leakage to the uplink signal. Analog low pass filters may improve analog-digital converter (ADC) dynamic range.

As indicated above, FIG. 3 is provided as an example. Other examples may differ from what is provided with regard to FIG. 3.

A UE and a base station may communicate based at least in part on an energy per resource element (EPRE). An EPRE identifies an energy level at a resource element (RE) granularity for an uplink communication or a downlink communication. EPRE may be configured as a ratio or offset relative to a signal with a known energy level so that the receiver can determine the EPRE of another signal based at least in part on the known power. As one example, consider a synchronization signal block (SSB). EPRE may be constant across the bandwidth and the secondary synchronization signal (SSS) carried in different synchronization signal (SS)/physical broadcast channel (PBCH) blocks (also referred to as SSBs). The ratio of SSS EPRE to PBCH demodulation reference signal (DM-RS) EPRE may be 0 dB in some aspects. The SSS EPRE may be derived from a parameter (e.g., ss-PBCH-BlockPower):

ss-PBCH-BlockPower INTEGER (−60 . . . 50),

As another example, consider a channel state information reference signal (CSI-RS). For the CSI-RS, EPRE may be constant across the configured bandwidth and OFDM symbols. The CSI-RS EPRE is derived via an offset. For example, the power offset of a non-zero-power (NZP) CSI-RS RE relative to an SSS RE may be defined by a parameter (e.g., powerControlOffsetSS):

powerControlOffsetSS ENUMERATED{db−3, db0, db3, db6}

The power offset of a physical downlink shared channel (PDSCH) RE relative to the NZP CSI-RS RE may be defined by a parameter (e.g., powerControlOffset, which may use values from −8 dB to 15 dB with 1 dB step size):

powerControlOffset INTEGER (−8 . . . 15)

A base station may benefit from decreasing EPRE during full-duplex, or may be limited with regard to the maximum EPRE that can be used for full-duplex operation. For example, EPRE may be different in a full-duplex slot than a half-duplex slot because of the antenna panel operation of the base station. In a half-duplex slot, the entire antenna panel may be used for a transmit operation or a receive operation, whereas in a full-duplex slot, part of the antenna panel may be used for a transmit operation and part of the antenna panel may be used for a receive operation. This may lead to changes in EPRE, for example, due to maximum transmit power of the base station's antenna panel or self-interference in the full-duplex mode. For example, increased EPRE in a full-duplex slot may be correlated with a smaller ACLR. Thus, the base station may benefit from decreasing EPRE during a full-duplex slot.

The EPRE may be set and updated via radio resource control (RRC) signaling, for example, by modifying the parameters shown above. However, in SBFD, a slot configuration (e.g., full-duplex versus half-duplex) may change from slot to slot. RRC configuration or reconfiguration may not provide sufficient responsiveness for slot-to-slot modification of the EPRE. If the same EPRE is used for full-duplex slots and half-duplex slots, the base station and the UE may experience increased self-interference, power-limited scenarios, and diminished throughput.

Some techniques and apparatuses described herein provide determination and/or signaling of EPRE on a slot-to-slot granularity, for example, for transitioning between half-duplex slots and full-duplex slots. For example, a base station may configure separate EPRE values for half-duplex slots and full-duplex slots, may configure an offset for a full-duplex slot EPRE relative to a half-duplex slot EPRE, and/or the like. Some UEs may determine whether to use a full-duplex slot EPRE or a half-duplex slot EPRE based at least in part on whether a slot is a full-duplex slot or a half-duplex slot, whereas other UEs may be configured or dynamically indicated regarding whether to use the full-duplex slot EPRE (e.g., based at least in part on whether a UE is capable of determining whether a slot is a full-duplex slot or a half-duplex slot). Furthermore, the full-duplex slot EPRE may be associated with a constant SSB EPRE, and EPRE offsets from the PDSCH to the demodulation reference signal (DMRS) and the NZP-CSI-RS may be defined, thereby enabling consistent SSB transmit power across all UEs while modifying transmit power of the PDSCH, the DMRS, and/or the CSI-RS for full-duplex operation. Thus, slot-to-slot adjustment of EPRE based at least in part on full-duplex slots and half-duplex slots is provided. The slot-to-slot adjustment of EPRE may reduce self-interference at the base station and improve performance in the full-duplex mode, thereby increasing throughput, improving utilization of communication resources, and improving coverage, particularly at the cell edge.

Figure 4:
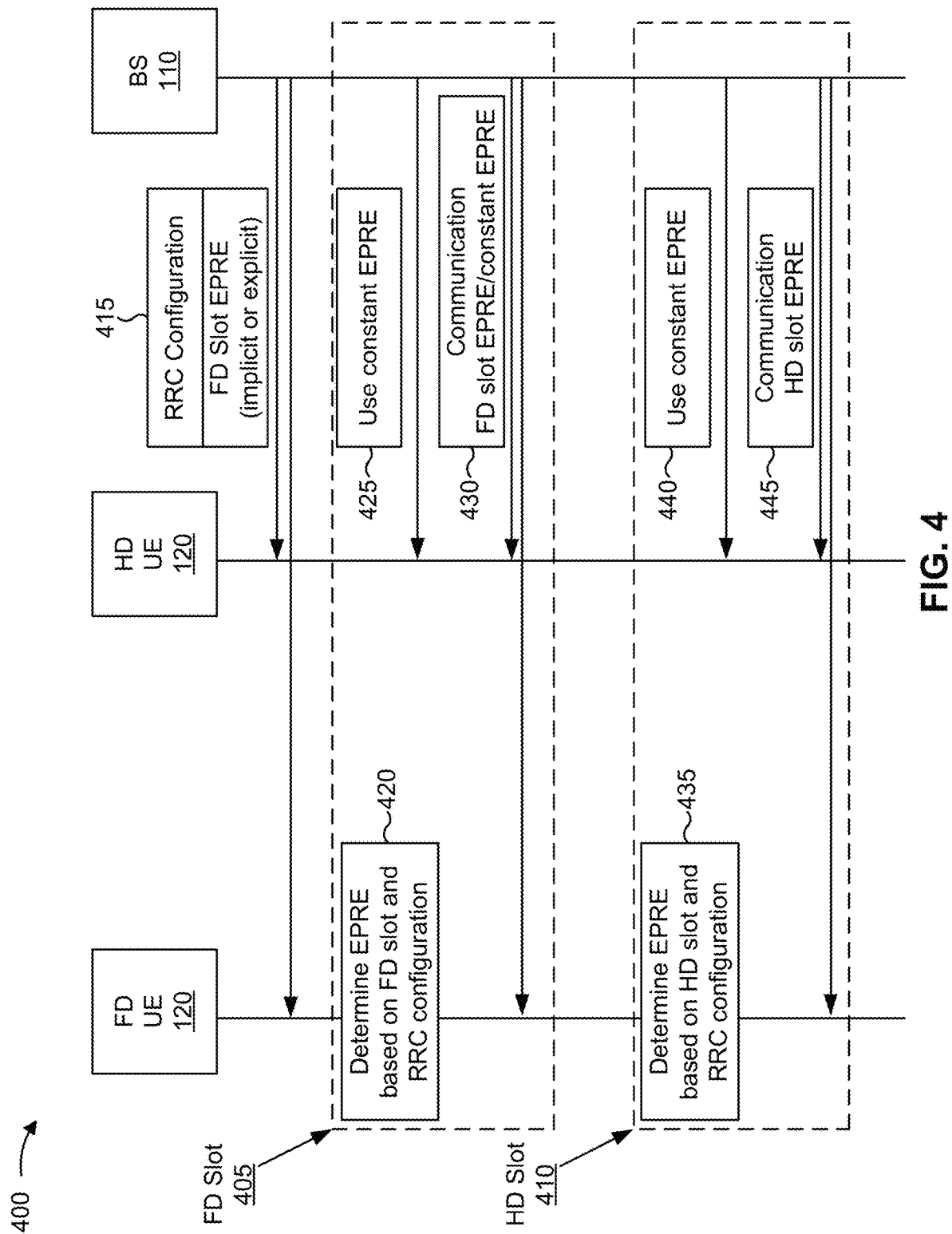
FIGS. 4-8 are diagrams illustrating examples of determination of EPRE values for a full-duplex slot and/or a half-duplex slot, in accordance with various aspects of the present disclosure.

FIG. 4 is a diagram illustrating an example 400 of determination of EPRE values for a full-duplex slot and/or a half-duplex slot, in accordance with various aspects of the present disclosure. As shown, example 400 includes a full-duplex (FD) UE 120 and a half-duplex (HD) UE 120, as well as a BS 110. The FD UE 120 may be capable of FD communication in a slot. The HD UE 120, in example 400, may be incapable of determining whether a slot is an HD slot or an FD slot. For example, the HD UE 120 may be a legacy UE. In some aspects, the HD UE 120 may not determine whether a slot is an HD slot or an FD slot (e.g., irrespective of whether the HD UE 120 is capable of doing so).

As shown, example 400 relates to an FD slot 405 and an HD slot 410. The operations enclosed within the dashed box labeled as "FD slot 405" may occur within an FD slot or may relate to an FD slot, and the operations enclosed within the dashed box labeled as "HD slot 410" may occur within an HD slot or may relate to an HD slot. The operations shown within a dashed box in FIGS. 4-8 may not necessarily occur within a single slot.

As shown by reference number 415, the BS 110 may provide configuration information (e.g., RRC configuration information and/or the like) to the FD UE 120 and/or the HD UE 120. In some aspects, the BS 110 may provide the configuration information to both of the FD UE 120 and the HD UE 120. In some aspects, the BS 110 may provide the configuration information to only one of the FD UE 120 or the HD UE 120. The configuration information may indicate a value of an FD slot EPRE (e.g., an EPRE value to be used for communication in an FD slot). In some aspects, the configuration information may identify a reduction (e.g., an offset) relative to an HD slot EPRE (e.g., a baseline EPRE), such as a reduction of X dB. For example, X may be based at least in part on an interference cancellation capability of the BS 110, a panel configuration in the FD slot, and/or the like. In some aspects, a UE (e.g., FD UE 120 or HD UE 120) may be pre-configured with a value of an FD slot EPRE or an offset defining the FD slot EPRE relative to an HD slot EPRE. For example, the value may be specified by a wireless communication standard, may be configured by an original equipment manufacturer or the UE, may be indicated in system information, and/or the like.

As shown by reference number 420, the FD UE 120 may determine the EPRE for the FD slot based at least in part on the slot being an FD slot and based at least in part on the RRC configuration. For example, the FD UE 120 may determine that the FD slot is an FD slot (e.g., based on receiving signaling indicating that the FD slot is an FD slot, based at least in part on information identifying a slot pattern that indicates that the FD slot is an FD slot, and/or the like). Accordingly, the FD UE 120 may determine that the EPRE for the FD slot is to be used. For example, the FD UE 120 may determine the EPRE for the FD slot based at least in part on the configuration information (e.g., based at least in part on the configuration information explicitly identifying the EPRE for the FD slot or based at least in part on applying an offset or reduction to an EPRE for an HD slot to determine the EPRE for the FD slot).

As shown by reference number 425, the BS 110 may use a constant EPRE (e.g., an HD slot EPRE) for the HD UE 120. For example, the BS 110 may not modify the HD slot EPRE for a legacy UE, since the legacy UE may not be capable of determining whether a given slot is an HD slot or an FD slot. Thus, the BS 110 may use different EPREs for different UEs (e.g., the FD UE 120 and the HD UE 120) based at least in part on capabilities of the different UEs. For an example relating to an HD UE 120 that can determine whether a slot is an HD slot or an FD slot, refer to FIG. 5.

As shown by reference number 430, the BS 110 may perform a communication with the FD UE 120 and the HD UE 120. The communication may include a single communication to both UEs 120 or respective communications for the two UEs. As further shown, the communication may use the FD slot EPRE for the FD UE 120 and the constant EPRE (e.g., the HD slot EPRE) For the HD UE 120. The FD UE 120 may use the FD slot EPRE to perform the communication. For example, the FD UE 120 may identify an EPRE for a received communication based at least in part on a reference signal and the FD slot EPRE, which may identify an offset between a power of the reference signal and a power for the received communication. The FD UE 120 may receive or decode the communication based at least in part on the EPRE for the received communication.

Referring now to the HD slot 410, as shown by reference number 435, the FD UE 120 may determine an EPRE based at least in part on determining that the HD slot is an HD slot and based at least in part on the RRC configuration. For example, the FD UE 120 may determine that the HD slot is an HD slot. The FD UE 120 may determine that the reduction is not to be applied to the HD slot EPRE or that the FD slot EPRE is not to be used for the HD slot 410. For example, the FD UE 120 may determine this on a slot-to-slot basis or without RRC reconfiguration of the HD slot EPRE and/or the FD slot EPRE.

As shown by reference number 440, the BS 110 may use the constant EPRE (e.g., the HD slot EPRE) for the HD UE 120 (e.g., the legacy UE 120). As shown by reference number 445, the BS 110 may transmit one or more communications to the FD UE 120 and the HD UE 120 using the HD slot EPRE. Thus, an FD slot EPRE or an HD slot EPRE may be used at a slot-to-slot granularity, thereby enabling slot-to-slot adjustment of the EPRE, reducing interference at the BS 110, and reducing overhead and latency associated with RRC signaling to reconfigure the EPRE.

As indicated above, FIG. 4 is provided as an example. Other examples may differ from what is described with regard to FIG. 4.

Figure 5:
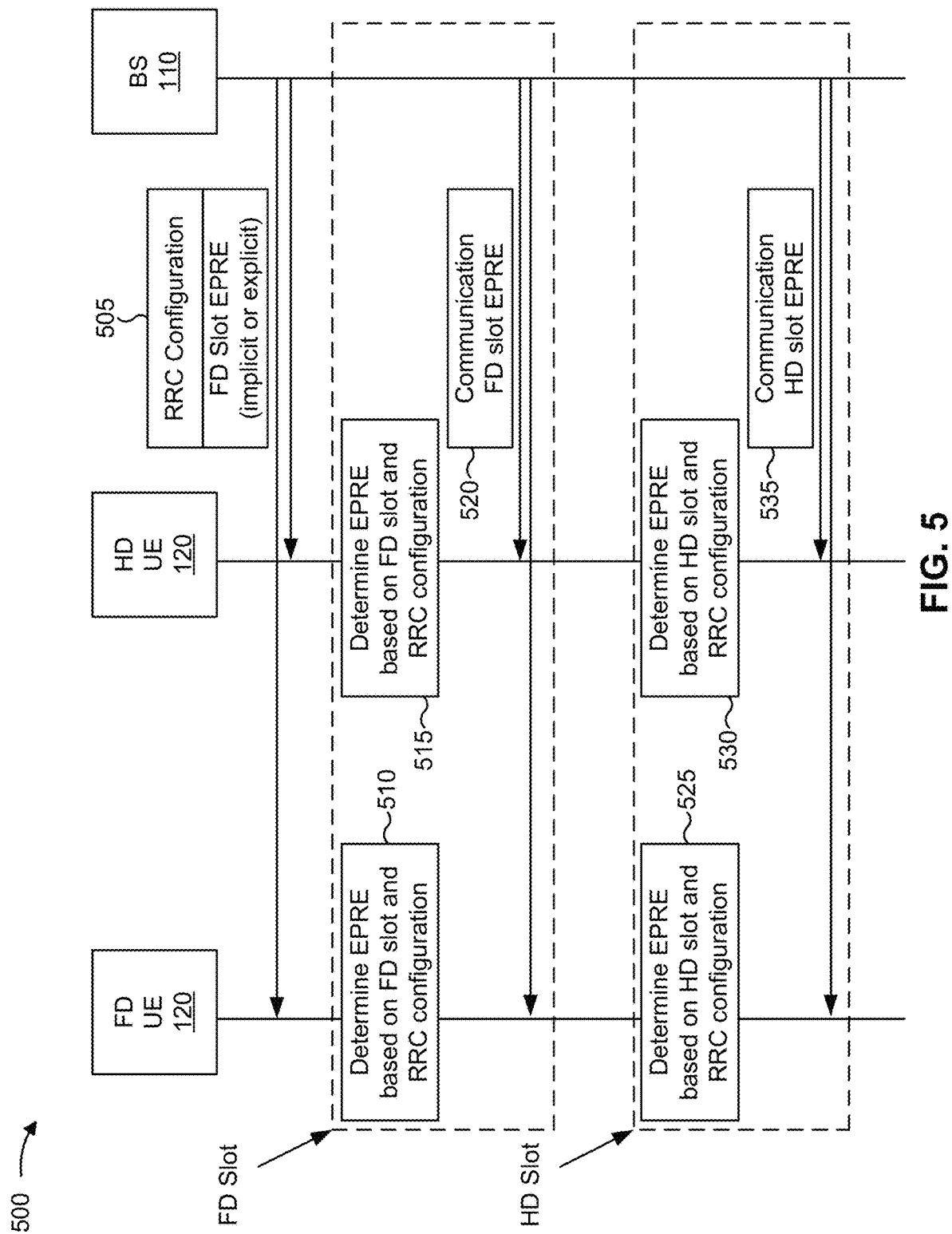

FIG. 5 is a diagram illustrating an example 500 of determination of EPRE values for a full-duplex slot and/or a half-duplex slot, in accordance with various aspects of the present disclosure. As shown, example 500 includes an FD UE 120 and a BS 110. The FD UE 120 is described in more detail in connection with FIG. 4. As further shown, example 500 includes an HD UE 120. The HD UE 120 of FIG. 5 may be capable of determining whether a slot is an FD slot or an HD slot (e.g., in a similar fashion as the FD UE 120) while operating in a half-duplex mode.

As shown by reference number 505, the BS 110 may provide configuration information (e.g., an RRC configuration and/or the like) to the FD UE 120 and/or the HD UE 120. For example, the configuration information may identify the FD slot EPRE and/or the HD slot EPRE, as described in more detail elsewhere herein.

As shown by reference numbers 510 and 515, the FD UE 120 and the HD UE 120 may determine the EPRE for the FD slot. For example, the FD UE 120 may determine that the FD slot EPRE is to be used based at least in part on identifying the FD slot as an FD slot. Furthermore, the FD UE 120 and the HD UE 120 may determine the FD slot EPRE based at least in part on the configuration information shown by reference number 505. Accordingly, the BS 110 may communicate with the FD UE 120 and/or the HD UE 120 in accordance with the FD slot EPRE.

Referring now to the HD slot, as shown by reference numbers 525 and 530, the FD UE 120 and the HD UE 120 may determine the EPRE for the HD slot. For example, the FD UE 120 may determine that the HD slot EPRE is to be used based at least in part on identifying the HD slot as an HD slot. Accordingly, as shown by reference number 535, the BS 110 may communicate with the FD UE 120 and/or the HD UE 120 in accordance with the HD slot EPRE.

As indicated above, FIG. 5 is provided as an example. Other examples may differ from what is described with regard to FIG. 5.

Figure 6:
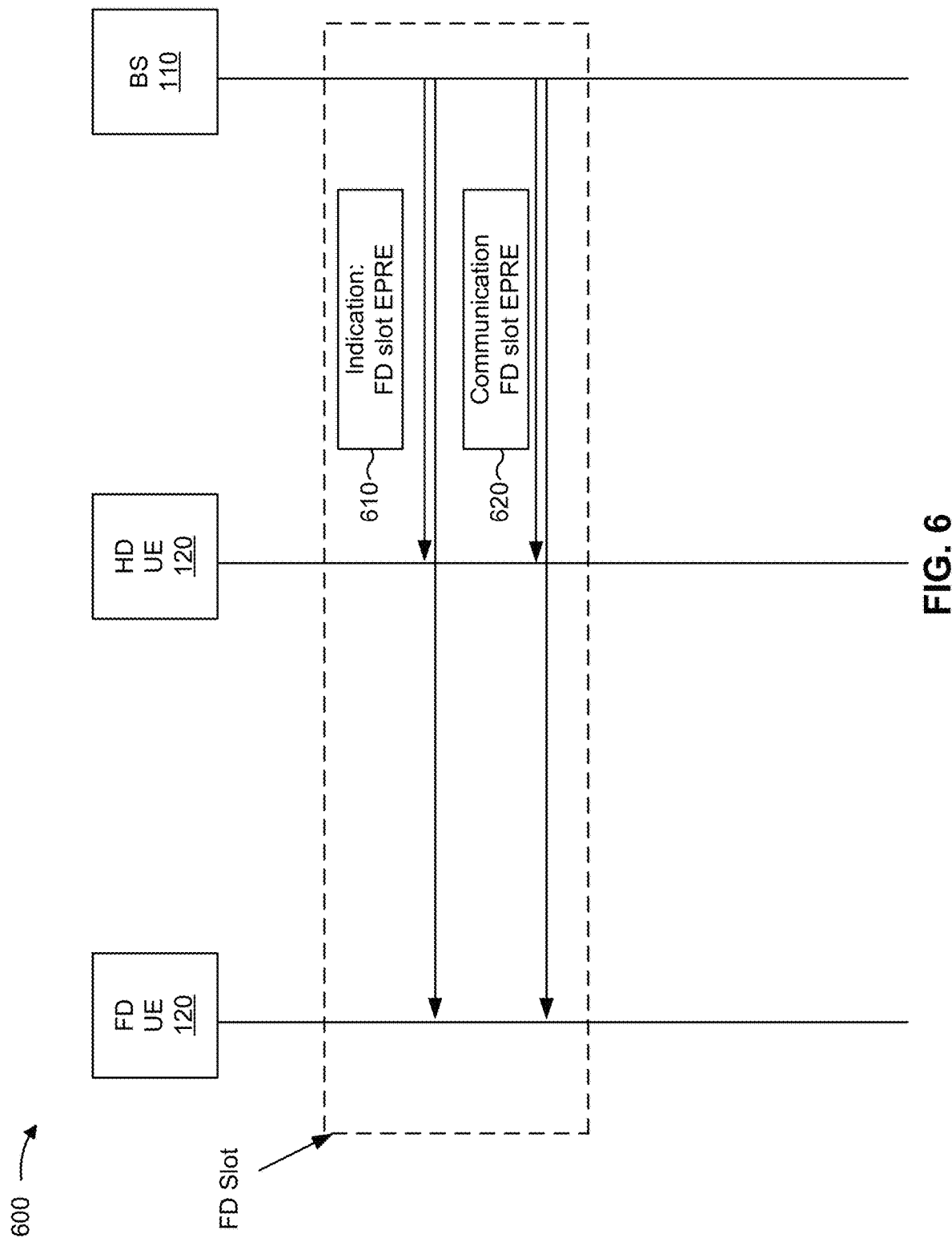

FIG. 6 is a diagram illustrating an example 600 of determination of EPRE values for a full-duplex slot and/or a half-duplex slot, in accordance with various aspects of the present disclosure. In example 600, the FD slot EPRE is explicitly indicated to the FD UE 120 and/or the HD UE 120. For example, as shown by reference number 610, the BS 110 may provide an indication of the FD slot EPRE to the FD UE 120 and the HD UE 120. In some aspects, the indication may directly identify the FD slot EPRE (e.g., may provide a value to be used as the FD slot EPRE), which provides more flexibility in EPRE configuration than an offset based approach. In some aspects, the indication may identify an offset from an HD slot EPRE (e.g., a ratio or reduction for the FD slot EPRE relative to the HD slot EPRE), which may provide a higher resolution for EPRE configuration than a direct indication based approach. In some aspects, the indication may include, for example, downlink control information (DCI), a medium access control (MAC) control element (CE), and/or the like. As shown by reference number 620, the BS 110 may communicate with the FD UE 120 and/or the HD UE 120 in accordance with the FD slot EPRE.

As indicated above, FIG. 6 is provided as an example. Other examples may differ from what is described with regard to FIG. 6.

Figure 7:
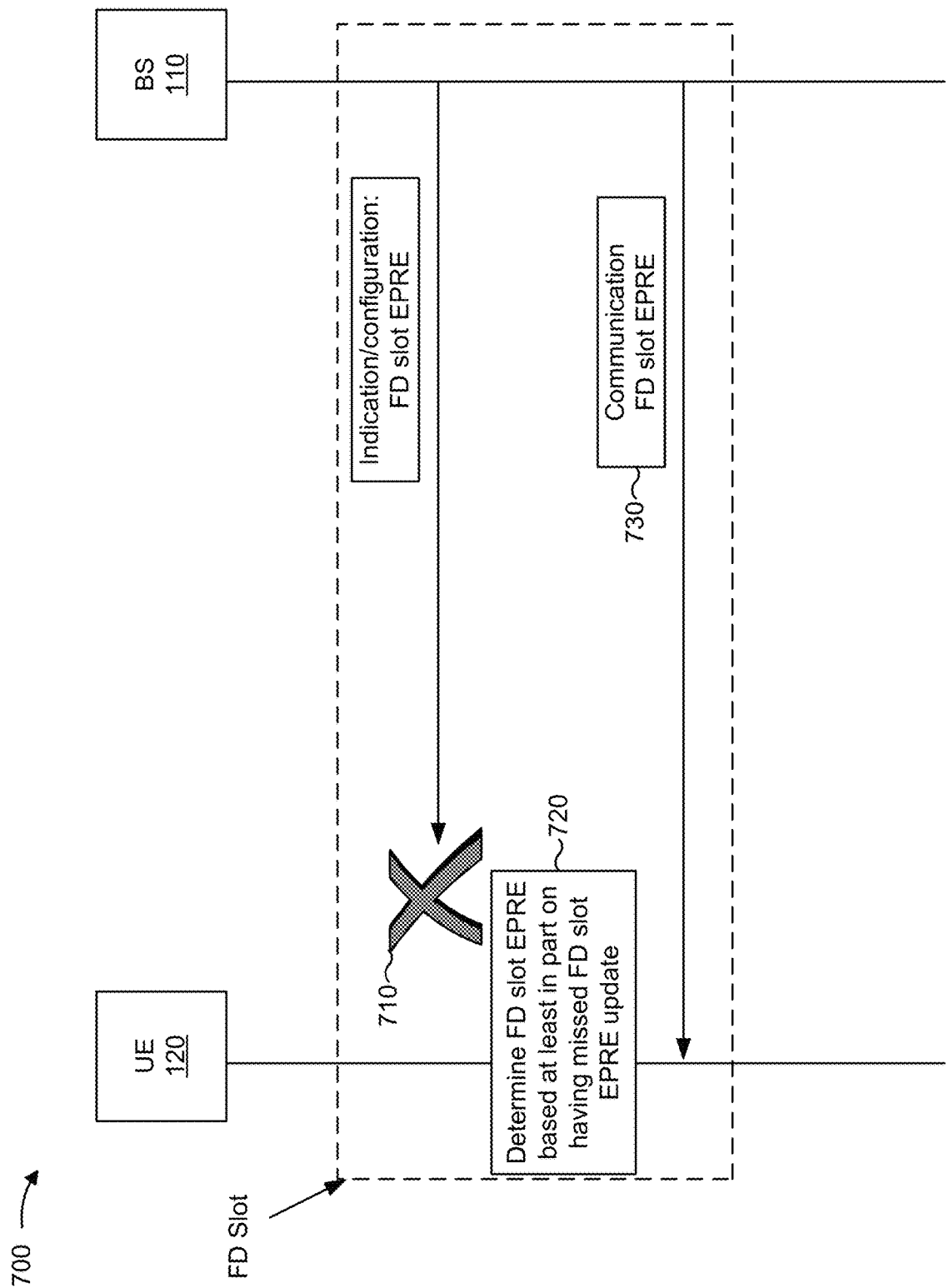

FIG. 7 is a diagram illustrating an example 700 of determination of EPRE values for a full-duplex slot and/or a half-duplex slot, in accordance with various aspects of the present disclosure. As shown, example 700 includes a UE 120. The UE 120 may be an FD UE 120 or an HD UE 120 (e.g., an HD UE 120 capable of determining whether a slot is an FD slot or an HD slot). Example 700 shows an example relating to determining the FD slot EPRE in the case that an indication or configuration of an updated FD slot EPRE is missed by the UE 120.

As shown by reference number 710, the UE 120 may not receive a message indicating a value or an update for the FD slot EPRE. For example, the UE 120 may fail to detect the message. Thus, as shown by reference number 720, the UE 120 may determine an FD slot EPRE to be used for the FD slot. In some aspects, the UE 120 may determine the FD slot EPRE based at least in part on a previous EPRE. For example, the UE 120 may use a last (e.g., most recently) signaled FD slot EPRE for the FD slot EPRE of example 700. In some aspects, the UE 120 may determine the FD slot EPRE based at least in part on a default value. For example, the BS 110 may configure (e.g., using RRC signaling and/or the like) the UE 120 with a default FD slot EPRE value to be used if an updated FD slot EPRE is not received for an FD slot. In some aspects, the UE 120 may determine the FD slot EPRE based at least in part on a pre-configured value, such as a value specified by a wireless telecommunications standard, an original equipment manufacturer, and/or the like. In this case, as one example, the value may be 3 dB, though other values may be used. As shown by reference number 730, the BS 110 may communicate with the UE 120 based at least in part on the FD slot EPRE. In some aspects, the BS 110 may determine the FD slot EPRE used by the UE 120 (e.g., based at least in part on receiving a negative acknowledgment regarding the indication or configuration of the FD slot EPRE). In some aspects, the BS 110 may transmit a communication to the UE 120 without having determined the FD slot EPRE.

As indicated above, FIG. 7 is provided as an example. Other examples may differ from what is described with regard to FIG. 7.

Figure 8:
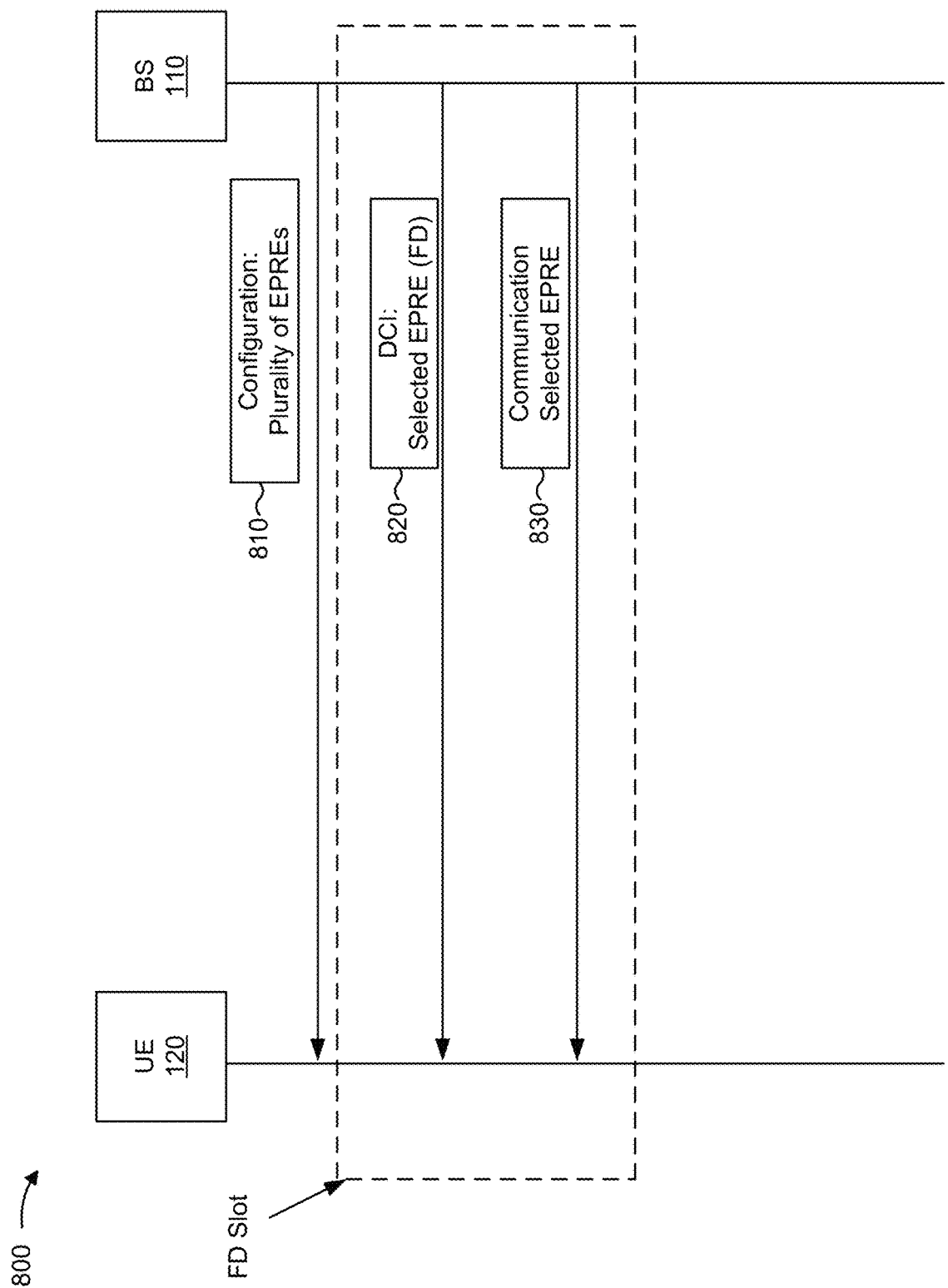

FIG. 8 is a diagram illustrating an example 800 of determination of EPRE values for a full-duplex slot and/or a half-duplex slot, in accordance with various aspects of the present disclosure. As shown, example 800 includes a UE 120. The UE 120 may be an FD UE 120 or an HD UE 120 (e.g., an HD UE 120 capable of determining whether a slot is an FD slot or an HD slot). Example 800 shows an example relating to indication of a selected EPRE from a plurality of configured EPRE.

As shown by reference number 810, the BS 110 may provide configuration information to the UE 120. As further shown, the configuration information may identify a plurality of EPREs. For example, the configuration information may identify values of the plurality of EPREs, respective offsets for the plurality of EPREs, and/or the like. In some aspects, the configuration information may indicate the EPREs based at least in part on offsets relative to reference signals. For example, the configuration information may indicate an offset relative to an SSB's EPRE, a PDSCH-to-CSI-RS offset, a PDSCH-to-DMRS offset, and/or the like.

In some aspects, the BS 110 may use a constant EPRE for an SSB (since the SSB is transmitted to FD UEs and legacy UEs) and the configuration information may identify one or more offsets used to determine EPREs of other communications (e.g., DMRS, PDSCH, NZP-CSI-RS, and/or the like). For example, the configuration information may indicate a table of EPRE offsets from a PDSCH to a DMRS, an FD slot EPRE offset between an NZP-CSI-RS and an SSS, an FD slot EPRE offset between a PDSCH and an NZP-CSI-RS, and/or the like. The configuration information may indicate only FD slot EPREs, only HD slot EPREs, or a combination of one or more FD slot EPREs and one or more HD slot EPREs.

As shown by reference number 820, the UE 120 may receive DCI indicating a selected EPRE. For example, the BS 110 may dynamically indicate the FD slot EPRE for the FD slot. In some aspects, the DCI may be associated with scheduling a PDSCH on the FD slot. In some aspects, the DCI may be separate from a scheduling DCI for the FD slot. In some aspects, the DCI may pertain to multiple slots and/or multiple UEs. For example, the DCI may indicate respective EPREs for a plurality of slots and/or a plurality of UEs. The indication of the selected EPRE may include one or more bits, where a larger number of bits may be used for a larger set of potential EPREs. As shown by reference number 830, the BS 110 may communicate with the UE 120 based at least in part on the selected EPRE. By configuring a plurality of EPREs and indicating a selected EPRE, overhead may be reduced relative to explicitly indicating a value of the selected EPRE.

As indicated above, FIG. 8 is provided as an example. Other examples may differ from what is described with regard to FIG. 8.

Figure 9:
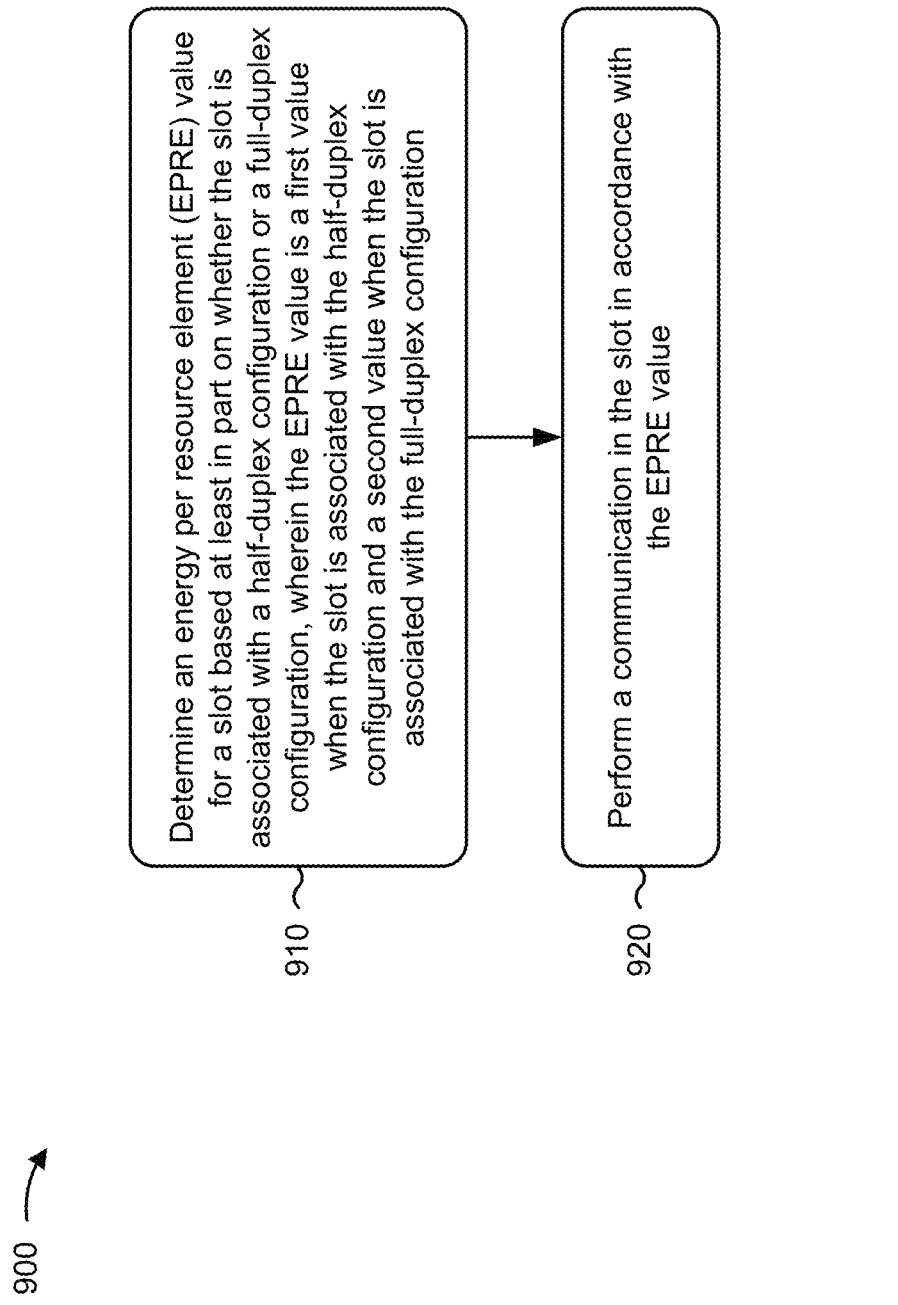
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120, HD UE 120, FD UE 120, and/or the like) performs operations associated with EPRE determination for sub-band full-duplex communications.

As shown in FIG. 9, in some aspects, process 900 may include determining an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration (block 910). For example, the UE (e.g., using antenna 252, DEMOD 254, MIMO detector 256, receive processor 258, controller/processor 280, and/or the like) may determine an EPRE value for a slot based at least in part on whether the slot is associated with a half-duplex configuration or a full-duplex configuration, as described above. In some aspects, the EPRE value is a first value (e.g., an HD slot EPRE) when the slot is associated with the half-duplex configuration and a second value (e.g., an FD slot EPRE) when the slot is associated with the full-duplex configuration. In some aspects, the full-duplex configuration may be associated with a base station, such as a base station with which the UE is communicating.

As further shown in FIG. 9, in some aspects, process 900 may include performing a communication in the slot in accordance with the EPRE value (block 920). For example, the UE (e.g., using antenna 252, DEMOD 254, MIMO detector 256, receive processor 258, controller/processor 280, and/or the like) may perform a communication in the slot in accordance with the EPRE value, as described above.

Process 900 may include additional aspects, such as any single aspect or any combination of aspects described below and/or in connection with one or more other processes described elsewhere herein.

In a first aspect, the UE is a full-duplex UE, and determining the EPRE value is based at least in part on a determination of whether the slot is associated with the full-duplex configuration.

In a second aspect, alone or in combination with the first aspect, process 900 includes receiving configuration information indicating one or more of the first value or the second value.

In a third aspect, alone or in combination with one or more of the first and second aspects, one or more of the first value or the second value is pre-configured.

In a fourth aspect, alone or in combination with one or more of the first through third aspects, the EPRE value is based at least in part on at least one of an interference cancellation capability of the base station, or a panel configuration for the full-duplex configuration.

In a fifth aspect, alone or in combination with one or more of the first through fourth aspects, process 900 includes switching from the first value to the second value, or from the second value to the first value, for the EPRE value, based at least in part on switching from a slot associated with a full-duplex configuration to a slot associated with a half-duplex configuration or from a slot associated with a half-duplex configuration to a slot associated with a full-duplex configuration.

In a sixth aspect, alone or in combination with one or more of the first through fifth aspects, the UE is a half-duplex UE, and determining the EPRE value is based at least in part on receiving information indicating the EPRE value for the slot.

In a seventh aspect, alone or in combination with one or more of the first through sixth aspects, the UE is a half-duplex UE, and determining the EPRE value is based at least in part on a determination of whether the slot is associated with the full-duplex configuration.

In an eighth aspect, alone or in combination with one or more of the first through seventh aspects, process 900 includes receiving, from the base station, information indicating the EPRE value for the slot.

In a ninth aspect, alone or in combination with one or more of the first through eighth aspects, process 900 includes receiving, from the base station, information indicating the EPRE value based at least in part on an offset from the second value.

In a tenth aspect, alone or in combination with one or more of the first through ninth aspects, determining the EPRE value further comprises determining a reduced EPRE value relative to a baseline EPRE value based at least in part on determining that information indicating the EPRE value was not received.

In an eleventh aspect, alone or in combination with one or more of the first through tenth aspects, the reduced EPRE value is based at least in part on a previous EPRE value for a full-duplex configuration.

In a twelfth aspect, alone or in combination with one or more of the first through eleventh aspects, the reduced EPRE value is based at least in part on a configured EPRE value for a full-duplex configuration.

In a thirteenth aspect, alone or in combination with one or more of the first through twelfth aspects, the reduced EPRE value is based at least in part on a fixed EPRE value for a full-duplex configuration.

In a fourteenth aspect, alone or in combination with one or more of the first through thirteenth aspects, determining the EPRE value further comprises determining the EPRE value based at least in part on received signaling indicating the EPRE value from a plurality of configured EPRE values.

In a fifteenth aspect, alone or in combination with one or more of the first through fourteenth aspects, the plurality of configured EPRE values are associated with information indicating respective offsets for the plurality of configured EPRE values relative to at least one of a synchronization signal block, a channel state information reference signal, or a demodulation reference signal.

In a sixteenth aspect, alone or in combination with one or more of the first through fifteenth aspects, the slot is associated with a constant synchronization signal block power relative to an adjacent slot, and the respective offsets are offsets for the full-duplex configuration relative to the first value associated with the half-duplex configuration.

In a seventeenth aspect, alone or in combination with one or more of the first through sixteenth aspects, the received signaling comprises downlink control information associated with the slot.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
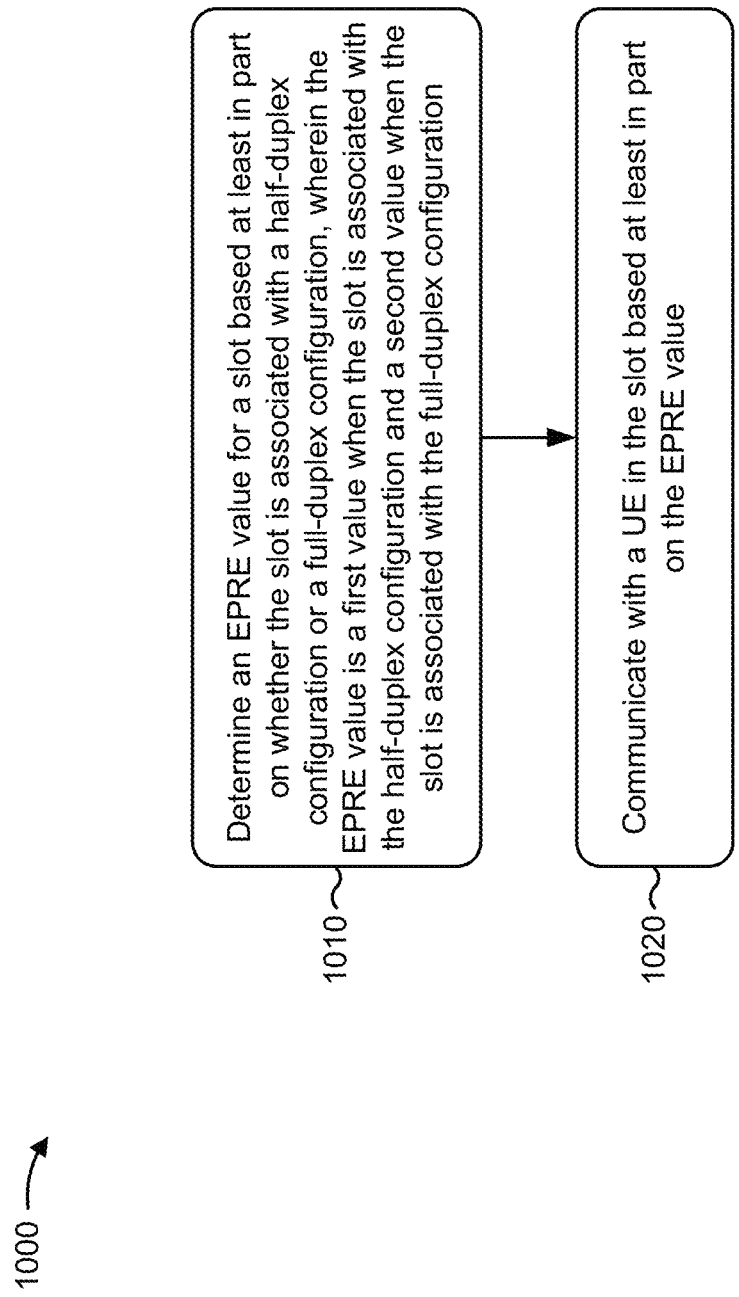
FIG. 10 is a diagram illustrating an example process performed, for example, by a user equipment, in accordance with various aspects of the present disclosure.

FIG. 10 is a diagram illustrating an example process 1000 performed, for example, by a base station, in accordance with various aspects of the present disclosure. Example process 1000 is an example where the base station (e.g., BS 110 and/or the like) performs operations associated with EPRE determination for SBFD communications.

As shown in FIG. 10, in some aspects, process 1000 may include determining an EPRE value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration (block 1010). For example, the base station (e.g., using controller/processor 240 and/or the like) may determine an EPRE value for a slot based at least in part on whether the slot is associated with a half-duplex configuration or a full-duplex configuration, as described above. In some aspects, the EPRE value is a first value when the slot is associated with the half-duplex configuration and a second value when the slot is associated with the full-duplex configuration.

As further shown in FIG. 10, in some aspects, process 1000 may include communicating with a UE in the slot based at least in part on the EPRE value (block 1020). For example, the base station may communicate with a UE in the slot based at least in part on the EPRE value, as described above.

Process 1000 may include additional aspects, such as any single aspect or any combination of aspects described below and/or in connection with one or more other processes described elsewhere herein.

In a first aspect, process 1000 includes transmitting, to the UE, configuration information indicating one or more of the first value or the second value.

In a second aspect, alone or in combination with the first aspect, the EPRE value is based at least in part on at least one of an interference cancellation capability of the base station, or a panel configuration for the full-duplex configuration.

In a third aspect, alone or in combination with one or more of the first and second aspects, process 1000 includes switching from the first value to the second value, or from the second value to the first value, for the EPRE value, based at least in part on switching from a slot associated with a full-duplex configuration to a slot associated with a half-duplex configuration.

In a fourth aspect, alone or in combination with one or more of the first through third aspects, the UE is a half-duplex UE, and process 1000 includes transmitting, to the UE, information indicating the EPRE value for the slot.

In a fifth aspect, alone or in combination with one or more of the first through fourth aspects, the UE is a half-duplex UE, and communicating with the UE based at least in part on the EPRE value is based at least in part on a determination of whether the slot is associated with the full-duplex configuration.

In a sixth aspect, alone or in combination with one or more of the first through fifth aspects, process 1000 includes transmitting, to the UE, information indicating the EPRE value for the slot.

In a seventh aspect, alone or in combination with one or more of the first through sixth aspects, process 1000 includes transmitting, to the UE, information indicating the EPRE value based at least in part on an offset from the second value.

In an eighth aspect, alone or in combination with one or more of the first through seventh aspects, process 1000 includes transmitting, to the UE, information indicating a configured EPRE value to be used as a reduced EPRE value relative to a baseline EPRE value based at least in part on determining that information indicating the EPRE value was not received by the UE.

In a ninth aspect, alone or in combination with one or more of the first through eighth aspects, process 1000 includes transmitting signaling indicating the EPRE value from a plurality of configured EPRE values.

In a tenth aspect, alone or in combination with one or more of the first through ninth aspects, process 1000 includes transmitting configuration information indicating the plurality of configured EPRE values, wherein the plurality of configured EPRE value are associated with information indicating respective offsets for the plurality of configured EPRE values relative to at least one of a synchronization signal block, a channel state information reference signal, or a demodulation reference signal.

In an eleventh aspect, alone or in combination with one or more of the first through tenth aspects, the slot is associated with a constant synchronization signal block power relative to an adjacent slot, and the respective offsets are offsets for the full-duplex configuration relative to the first value associated with the half-duplex configuration.

In a twelfth aspect, alone or in combination with one or more of the first through eleventh aspects, the signaling comprises downlink control information associated with the slot.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some aspects of the present disclosure:

Aspect 1: A method of wireless communication performed by a user equipment (UE), comprising: determining an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and performing a communication in the slot in accordance with the EPRE value.

Aspect 2: The method of aspect 1, wherein the UE is a full-duplex UE, and wherein determining the EPRE value is based at least in part on a determination, by the UE, of whether the slot is associated with the full-duplex configuration.

Aspect 3: The method of any of aspects 1-2, further comprising: receiving configuration information indicating one or more of the first value or the second value.

Aspect 4: The method of any of aspects 1-3, wherein one or more of the first value or the second value is preconfigured.

Aspect 5: The method of any of aspects 1-4, wherein the EPRE value is based at least in part on at least one of an interference cancellation capability of the base station, or a panel configuration for the full-duplex configuration.

Aspect 6: The method of any of aspects 1-5, further comprising: switching from the first value to the second value, or from the second value to the first value, for the EPRE value, based at least in part on switching from a slot associated with a full-duplex configuration to a slot associated with a half-duplex configuration or from a slot associated with a half-duplex configuration to a slot associated with a full-duplex configuration.

Aspect 7: The method of any off aspects 1-6, wherein the UE is a half-duplex UE, and wherein determining the EPRE value is based at least in part on receiving information indicating the EPRE value for the slot.

Aspect 8: The method of any of aspects 1-7, wherein the UE is a half-duplex UE, and wherein determining the EPRE value is based at least in part on a determination, by the UE, of whether the slot is associated with the full-duplex configuration.

Aspect 9: The method of any of aspects 1-8, further comprising: receiving, from the base station, information indicating the EPRE value for the slot.

Aspect 10: The method of any of aspects 1-9, further comprising: receiving, from the base station, information indicating the EPRE value based at least in part on an offset from the second value.

Aspect 11: The method of any of aspects 1-11, wherein determining the EPRE value further comprises: determining a reduced EPRE value relative to a baseline EPRE value based at least in part on determining that information indicating the EPRE value was not received.

Aspect 12: The method of aspect 11, wherein the reduced EPRE value is based at least in part on a previous EPRE value for a full-duplex configuration.

Aspect 13: The method of aspect 11, wherein the reduced EPRE value is based at least in part on a configured EPRE value for a full-duplex configuration.

Aspect 14: The method of aspect 11, wherein the reduced EPRE value is based at least in part on a fixed EPRE value for a full-duplex configuration.

Aspect 15: The method of any of aspects 1-10, wherein determining the EPRE value further comprises: determining the EPRE value based at least in part on received signaling indicating the EPRE value from a plurality of configured EPRE values.

Aspect 16: The method of aspect 15, wherein the plurality of configured EPRE values are associated with information indicating respective offsets for the plurality of configured EPRE values relative to at least one of a synchronization signal block, a channel state information reference signal, or a demodulation reference signal.

Aspect 17: The method of aspect 16, wherein the slot is associated with a constant synchronization signal block power relative to an adjacent slot, and wherein the respective offsets are offsets for the full-duplex configuration relative to the first value associated with the half-duplex configuration.

Aspect 18: The method of aspect 15, wherein the received signaling comprises downlink control information associated with the slot.

Aspect 19: A method of wireless communication performed by a base station, comprising: determining an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and communicating with a user equipment (UE) in the slot based at least in part on the EPRE value.

Aspect 20: The method of aspect 19, wherein the EPRE value is based at least in part on at least one of an interference cancellation capability of the base station, or a panel configuration for the full-duplex configuration.

Aspect 21: The method of any of aspects 19-20, further comprising: switching from the first value to the second value, or from the second value to the first value, for the EPRE value, based at least in part on switching from a slot associated with a full-duplex configuration to a slot associated with a half-duplex configuration.

Aspect 22: The method of any of aspects 19-21, wherein the UE is a half-duplex UE, and wherein the method further comprises transmitting, to the UE, information indicating the EPRE value for the slot.

Aspect 23: The method of any of aspects 19-22, wherein the UE is a half-duplex UE, and wherein communicating with the UE based at least in part on the EPRE value is based at least in part on a determination, by the UE, of whether the slot is associated with the full-duplex configuration.

Aspect 24: The method of any of aspects 19-23, further comprising: transmitting, to the UE, information indicating the EPRE value for the slot.

Aspect 25: The method of any of aspects 19-24, further comprising: transmitting, to the UE, information indicating the EPRE value based at least in part on an offset from the second value.

Aspect 26: The method of any of aspects 19-25, further comprising: transmitting, to the UE, information indicating a configured EPRE value to be used as a reduced EPRE value relative to a baseline EPRE value based at least in part on determining that information indicating the EPRE value was not received by the UE.

Aspect 27: The method of any of aspects 19-26, further comprising: transmitting signaling indicating the EPRE value from a plurality of configured EPRE values.

Aspect 28: The method of aspect 27, further comprising: transmitting configuration information indicating the plurality of configured EPRE values, wherein the plurality of configured EPRE values are associated with information indicating respective offsets for the plurality of configured EPRE values relative to at least one of a synchronization signal block, a channel state information reference signal, or a demodulation reference signal.

Aspect 29: An apparatus for wireless communication at a device, comprising a processor; memory coupled with the processor; and instructions stored in the memory and executable by the processor to cause the apparatus to perform the method of one or more aspects of aspects 1-28.

Aspect 30: A device for wireless communication, comprising a memory and one or more processors coupled to the memory, the memory and the one or more processors configured to perform the method of one or more aspects of aspects 1-28.

Aspect 31: An apparatus for wireless communication, comprising at least one means for performing the method of one or more aspects of aspects 1-28.

Aspect 32: A non-transitory computer-readable medium storing code for wireless communication, the code comprising instructions executable by a processor to perform the method of one or more aspects of aspects 1-28.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), the method comprising:
    determining an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and
    communicating in the slot in accordance with the EPRE value.

2. A method of wireless communication performed by a network entity, the method comprising:
    determining an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and
    communicating with a user equipment (UE) in the slot based at least in part on the EPRE value.

3. A user equipment (UE) for wireless communication, comprising:
    a memory; and
    one or more processors coupled to the memory, the one or more processors configured to:
        determine an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and
        communicate in the slot in accordance with the EPRE value.

4. The UE of claim 3, wherein the UE is a full-duplex UE, and wherein the EPRE value is based at least in part on whether the slot is associated with the full-duplex configuration.

5. The UE of claim 3, wherein the one or more processors are further configured to:
    receive configuration information indicating one or more of the first value or the second value.

6. The UE of claim 3, wherein one or more of the first value or the second value is pre-configured.

7. The UE of claim 3, wherein the EPRE value is based at least in part on at least one of an interference cancellation capability of a network entity, or a panel configuration for the full-duplex configuration.

8. The UE of claim 3, wherein the one or more processors are further configured to:
    switch from the first value to the second value, or from the second value to the first value, based at least in part on a switch from a slot associated with a full-duplex configuration to a slot associated with a half-duplex configuration or from a slot associated with a half-duplex configuration to a slot associated with a full-duplex configuration.

9. The UE of claim 3, wherein the UE is a half-duplex UE, and wherein the one or more processors are further configured to:
    receive information indicating the first value, and wherein the one or more processors, to determine the EPRE value, are configured to determine the EPRE value is the first value based at least in part on receiving the information indicating the first value.

10. The UE of claim 3, wherein the UE is a half-duplex UE, and wherein the one or more processors are further configured to:
    determine that the slot is associated with the full-duplex configuration.

11. The UE of claim 3, wherein the one or more processors are further configured to:
    receive, from a network entity, information indicating whether the slot is associated with the half-duplex configuration or the full-duplex configuration.

12. The UE of claim 3, wherein the one or more processors are further configured to:

receive, from a network entity, information indicating that the second value is based at least in part on an offset from the first value.

13. The UE of claim 3, wherein the one or more processors, to determine the EPRE value, are further configured to:
determine that the UE did not receive, for the slot, information indicating at least one of the first value or the second value;
determine a reduced EPRE value relative to a baseline EPRE value based at least in part on the determination that the UE did not receive the information; and
determine to use the reduced EPRE value as the EPRE value.

14. The UE of claim 13, wherein the reduced EPRE value is based at least in part on a previous EPRE value for a full-duplex configuration.

15. The UE of claim 13, wherein the reduced EPRE value is based at least in part on a configured EPRE value for a full-duplex configuration.

16. The UE of claim 13, wherein the reduced EPRE value is based at least in part on a fixed EPRE value for a full-duplex configuration.

17. The UE of claim 3, wherein the one or more processors, to determine the EPRE value, are further configured to:
determine the EPRE value based at least in part on received signaling indicating at least one of the first value or the second value from a plurality of configured EPRE values.

18. The UE of claim 17, wherein the plurality of configured EPRE values are associated with information indicating respective offsets for the plurality of configured EPRE values relative to at least one of a synchronization signal block, a channel state information reference signal, or a demodulation reference signal.

19. The UE of claim 18, wherein the slot is associated with a constant synchronization signal block power relative to an adjacent slot, and wherein the respective offsets are offsets for the full-duplex configuration relative to the first value.

20. The UE of claim 17, wherein the received signaling comprises downlink control information associated with the slot.

21. A network entity for wireless communication, comprising:
a memory; and
one or more processors coupled to the memory, the one or more processors configured to:
determine an energy per resource element (EPRE) value for a slot based at least in part on whether the slot is associated with a half-duplex configuration or a full-duplex configuration, wherein the EPRE value is a first value when the slot is associated with the half-duplex configuration and a second value when the slot is associated with the full-duplex configuration; and
communicate with a user equipment (UE) in the slot based at least in part on the EPRE value.

22. The network entity of claim 21, wherein the EPRE value is based at least in part on at least one of an interference cancellation capability of the network entity, or a panel configuration for the full-duplex configuration.

23. The network entity of claim 21, wherein the one or more processors are further configured to:
switch from the first value to the second value, or from the second value to the first value, based at least in part on a switch from a slot associated with a full-duplex configuration to a slot associated with a half-duplex configuration.

24. The network entity of claim 21, wherein the UE is a half-duplex UE, and wherein the one or more processors are further configured to:
transmit, to the UE, information indicating the EPRE value for the slot.

25. The network entity of claim 21, wherein the UE is a half-duplex UE, and wherein the one or more processors are further configured to:
determine whether the slot is associated with the full-duplex configuration.

26. The network entity of claim 21, wherein the one or more processors are further configured to:
transmit, to the UE, information indicating the EPRE value for the slot.

27. The network entity of claim 21, wherein the one or more processors are further configured to:
transmit, to the UE, information indicating that the second value is based at least in part on an offset from the first value.

28. The network entity of claim 21, wherein the one or more processors are further configured to:
determine that information indicating the EPRE value was not received by the UE; and
transmit, to the UE and based at least in part on the determination that the information indicating the EPRE value was not received by the UE, information indicating a configured EPRE value to be used as a reduced EPRE value relative to a baseline EPRE value.

29. The network entity of claim 21, wherein the one or more processors are further configured to:
transmit configuration information indicating a plurality of configured EPRE values, wherein the plurality of configured EPRE values are associated with information indicating respective offsets for the plurality of configured EPRE values relative to at least one of a synchronization signal block, a channel state information reference signal, or a demodulation reference signal.

30. The network entity of claim 29, wherein the one or more processors are further configured to:
transmit signaling indicating the EPRE value from the plurality of configured EPRE values.

* * * * *